Jan. 7, 1930.  W. C. HEINDL  1,742,537
MOUNTING FOR ANTIGLARE SHIELDS
Filed April 2, 1928

William C. Heindl
Inventor

Patented Jan. 7, 1930

1,742,537

UNITED STATES PATENT OFFICE

WILLIAM C. HEINDL, OF ROCHESTER, NEW YORK

MOUNTING FOR ANTIGLARE SHIELDS

Application filed April 2, 1928. Serial No. 266,542.

This invention relates to antiglare shields that are usually attached to wind-shields of automobiles for the protection of the eyes of the driver against the glare of headlights of approaching cars, or against glare reflected in the mirror from cars following, or against the glare of the sunlight and its reflected light rays. The object of the invention is to provide an improved mounting for such a glare shield by means of which it may be supported at any desired point on the wind shield and held yieldingly locked in different predetermined positions with relation to the wind shield, where it will either be in the line or out of the line of vision of the driver of the car.

These and other objects of the invention will be fully illustrated in the drawing, described in the specification and pointed out in the claims at the end hereof.

In the accompanying drawing;—

In the several figures of the drawing like numerals indicate like parts.

Figure 1:
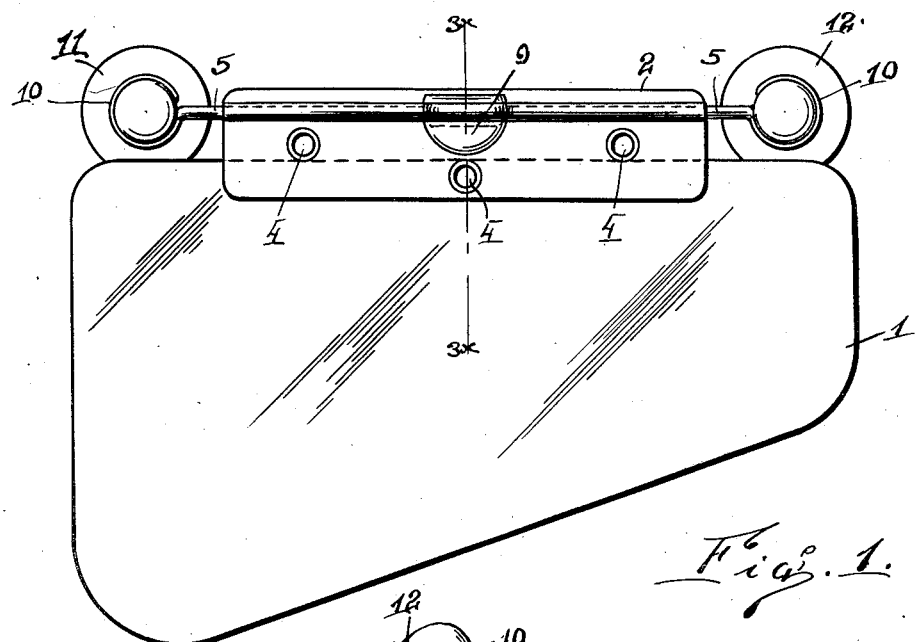
Figure 1 is a front elevation of the improved glare shield.

The antiglare shield forming the subject matter of my present invention is an improvement over other glare shields in that the shield can be yieldingly locked in two or more predetermined positions in order to either hold the glare reducing material of the antiglare shield on the wind shield in the line of vision, or out of the line of vision of the driver of the car.

This is made possible by means of a new and novel support having a snap action, from which the shield is suspended.

As illustrated in the drawing, the antiglare shield which is preferably made of pyroxylin or other suitable material has fastened to the upper edge thereof a pair of metal straps 2 and 3, one on each side of the edge. Eyelets 4—4 or any other suitable means are used to fasten the metal straps to the upper edge of the glare shield. Preferably three such eyelets are used and the two eyelets near the ends of the metal straps pass only through the straps just above the edge of the glare shield, while the center eyelet passes through the metal straps as well as the portion of the glare shield between them. The outer eyelets serve to line up the upper edge of the glare shield in the metal straps while the third or center eyelet fastens the glare shield to the metal straps and holds its upper edge against the other two eyelets. This arrangement of the eyelets prevents any movement of the glare shield between the metal straps with but one eyelet passing through both the straps and the glare shield, although all the eyelets could pass through the glare shield if the glare shield was perforated accordingly. The metal straps 2 and 3 project above the glare shield and form yielding members between which the supporting shaft 5 passes from one end to the other.

In order to form a suitable bearing for the shaft between the yielding members grooves 6 and 7 are provided in their inner and opposing free sides. The walls of these grooves partially encircle the shaft 5 and hold the shaft in line in the straps and allow the straps with the antiglare shield to swing on said shaft.

Figure 2:
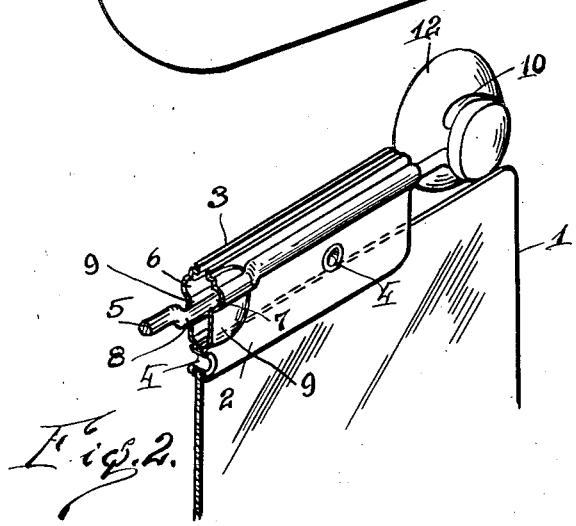
Figure 2 is a detail sectional and perspective view of a portion of the antiglare shield and its mounting.
Figure 3:
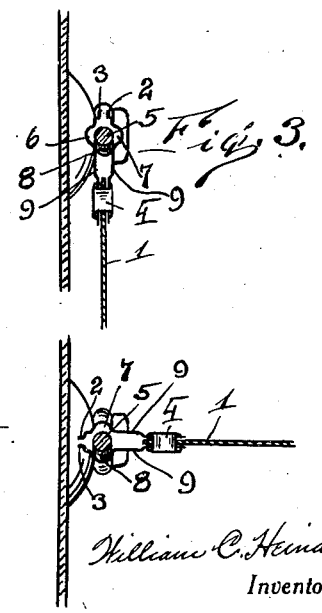
Figure 3 is a detail vertical sectional view of the antiglare shield, the section being taken on the line 3ˣ—3ˣ of Figure 1.
Figure 4:
Figure 4 is a similar sectional view with the antiglare shield swung into a horizontal position and held yieldingly locked in place in this position.

For the purpose of yieldingly locking the antiglare shield in one or more predetermined radial positions on the shaft 5 the shaft is provided with an offset 8 located preferably in the middle of the shaft. At the point between the straps 1 and 2 where this offset 8 is located on the shaft 5, a blister or pocket 9 is struck out from the inside of each of the straps to permit the offset 8 to project up or down between the straps so that the walls of these pockets resting against the offset prevent a free swinging movement of the straps on the shaft. The grooves 6 and 7 continue and extend through the pockets 9 and thus provide additional depressions in the pockets 9, into which the offset 8 on the shaft 5 can engage, thereby yieldingly locking the straps in this position on the shaft. This takes place when the glare shield is swung from the position illustrated in Figures 1, 2 and 3 to the position illustrated in Figure 4. Slight force is necessary to swing the antiglare shield because in turning the metal straps 2 and 3 are sprung or spread by the offset 8 until the offset can engage in either the grooves 6 or 7. When the offset 8 engages into one or the other of the grooves 6 or 7, the metal straps 2 and 3 again spring together so that the engagement of the offset with one of the grooves serves to yieldingly lock the glare shield in a different radial position on the shaft 5. In this way the antiglare shield may be quickly swung from one angular position to another, and held yieldingly locked in this position at the end of its swinging movement.

The supporting shaft 5 is held fixed on the wind shield by means of a pair of rubber suction cups 11 and 12 provided at each end thereof, or by means of screws fastening the shaft directly to the wood or metal portion of the wind shield. In this instance suction cups are used and the shaft is fastened to the suction cups by providing a loop or eye 10 at each end of the shaft so that the back of the suction cups can engage into these eyes and not only support the shaft in any desired location on the wind shield, but at the same time prevent the shaft from turning. This is necessary in order to hold the offset 8 on the shaft 5 fixed while the antiglare shield is being turned or swung radially on the shaft.

It will be understood that the principal object of this invention is to provide a yielding self locking support for the glare shield and such changes as the incorporating of the two metal straps into a single formed blank, or other changes to reduce production costs to accomplish this same purpose, namely, a yielding self locking support, may be employed, as set forth in the following:

I claim:

1. In an antiglare shield the combination of a shaft and means for holding said shaft from rotating, an offset provided on said shaft, a glare shield, and a pair of yielding members at one end of said shield embracing said shaft, a pocket provided in each of said yielding members to receive said offset and to hold said shield yieldingly locked in a plurality of radial positions on said shaft.

2. In an anti-glare shield the combination of a shaft and means for holding said shaft from rotating, a shield, a pair of metal straps fastened to the edge thereof and forming a pair of yielding suspension members for said shield, a longitudinal groove on the inside of said straps and opposite each other, said shaft located between said grooves and forming a pivot for said straps and the shield to swing thereon, an offset on said shaft and means provided in said straps to allow said offset to engage therein and yieldingly hold said straps and the glare shield in a plurality of radial positions on said shaft.

WILLIAM C. HEINDL.